(12) United States Patent
Dorsey

(10) Patent No.: US 12,200,316 B2
(45) Date of Patent: *Jan. 14, 2025

(54) SYSTEMS AND METHODS FOR PRESENTING CLOSED CAPTION AND SUBTITLE DATA DURING FAST-ACCESS PLAYBACK OPERATIONS

(71) Applicant: Adeia Guides Inc., San Jose, CA (US)

(72) Inventor: Eric Dorsey, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,170

(22) Filed: Sep. 7, 2023

(65) Prior Publication Data

US 2023/0421861 A1 Dec. 28, 2023

Related U.S. Application Data

(63) Continuation of application No. 17/405,282, filed on Aug. 18, 2021, now Pat. No. 11,785,312, which is a continuation of application No. 16/753,981, filed as application No. PCT/US2017/055541 on Oct. 6, 2017, now Pat. No. 11,128,929.

(51) Int. Cl.
*H04N 21/65* (2011.01)
*H04N 21/4402* (2011.01)
*H04N 21/488* (2011.01)
*H04N 21/6587* (2011.01)

(52) U.S. Cl.
CPC . *H04N 21/6587* (2013.01); *H04N 21/440281* (2013.01); *H04N 21/4884* (2013.01)

(58) Field of Classification Search
CPC ....... H04N 21/6587; H04N 21/440281; H04N 21/4884
See application file for complete search history.

(56) References Cited

U.S. PATENT DOCUMENTS

| 5,751,371 | A | * | 5/1998 | Shintani | G11B 27/105 348/553 |
| 5,848,217 | A | * | 12/1998 | Tsukagoshi | H04N 5/783 386/E5.052 |
| 6,993,246 | B1 | * | 1/2006 | Pan | H04L 67/12 386/239 |
| 9,456,170 | B1 | * | 9/2016 | Miller | G11B 27/10 |
| 11,128,929 | B2 | | 9/2021 | Dorsey | |
| 2003/0194213 | A1 | * | 10/2003 | Schultz | G11B 27/005 386/E5.052 |
| 2004/0252979 | A1 | * | 12/2004 | Momosaki | H04N 5/445 348/E5.122 |
| 2005/0185929 | A1 | * | 8/2005 | Kang | G11B 27/323 386/E5.052 |

(Continued)

*Primary Examiner* — Timothy R Newlin
(74) *Attorney, Agent, or Firm* — Haley Guiliano LLP

(57) ABSTRACT

Systems and methods are disclosed herein for presenting subtitle data during media asset fast-access playback operations. Specifically, the system may detect initiation of a fast-access playback operation during playback of a media asset and identify consecutive frames to be displayed during the fast-access playback operation that have associated subtitle data. The system may combine the subtitle data associated with the consecutive frames into a display arrangement and generate for display, with each consecutive frame, instead of the associated subtitle data, the display arrangement.

20 Claims, 7 Drawing Sheets

(56) References Cited

U.S. PATENT DOCUMENTS

| | | | | |
|---|---|---|---|---|
| 2008/0166106 A1* | 7/2008 | Ozawa | ............... | H04N 21/8113 |
| | | | | 386/245 |
| 2009/0167940 A1* | 7/2009 | Card, II | ............... | H04N 21/235 |
| | | | | 386/245 |
| 2009/0184887 A1* | 7/2009 | Mizuno | .................... | H04N 5/57 |
| | | | | 345/1.1 |
| 2009/0190031 A1* | 7/2009 | Guihot | ................. | H04N 21/435 |
| | | | | 348/468 |
| 2010/0042924 A1* | 2/2010 | Kim | .................... | H04N 21/435 |
| | | | | 715/716 |
| 2010/0153885 A1* | 6/2010 | Yates | .................. | G06F 16/7867 |
| | | | | 707/723 |
| 2010/0214475 A1* | 8/2010 | Yazawa | .............. | H04N 21/4348 |
| | | | | 348/E7.001 |
| 2010/0241953 A1* | 9/2010 | Kim | ................... | H04N 21/4884 |
| | | | | 715/256 |
| 2011/0044662 A1* | 2/2011 | Gandolph | .......... | H04N 21/4884 |
| | | | | 386/E5.028 |
| 2013/0308922 A1* | 11/2013 | Sano | ............... | H04N 21/47217 |
| | | | | 386/245 |
| 2014/0334799 A1* | 11/2014 | Dhawan | ............. | H04N 21/2387 |
| | | | | 386/244 |
| 2015/0208139 A1* | 7/2015 | Homyack | .............. | H04N 5/445 |
| | | | | 348/468 |
| 2016/0119691 A1* | 4/2016 | Accardo | .............. | H04N 21/233 |
| | | | | 725/18 |
| 2016/0295294 A1* | 10/2016 | Lan | ...................... | H04N 21/845 |
| 2018/0277142 A1* | 9/2018 | Veeramani | .............. | G10L 25/57 |

* cited by examiner

SYSTEMS AND METHODS FOR PRESENTING CLOSED CAPTION AND SUBTITLE DATA DURING FAST-ACCESS PLAYBACK OPERATIONS

CROSS-REFERENCE TO RELATED APPLICATIONS

This application is a continuation of pending U.S. patent application Ser. No. 17/405,282, filed Aug. 18, 2021, which is a continuation of U.S. patent application Ser. No. 16/753,981 filed Apr. 6, 2020, now U.S. Pat. No. 11,128,929, which is a national stage application under 35 U.S.C. § 371 of International Application PCT/US2017/055541, filed Oct. 6, 2017, each of which is hereby incorporated by reference herein in their entireties.

BACKGROUND

Various playback systems enable a user to perform a fast-access playback operation on media assets. For example, a user is able to fast-forward or rewind a media asset while the media asset is being played. In digital media, the fast-forward and rewind operations are implemented by excluding certain frames from being displayed to a viewer. This implementation creates a difficulty in properly displaying subtitles or closed caption data because that data may be attached to frames that are excluded from the display, thereby causing a viewer to miss some subtitles. Current systems address this issue in different ways. Some systems refrain from displaying subtitles and/or closed caption data when fast-access playback operations are triggered. Other systems display at least some frames that have associated subtitle data.

These solutions are unsatisfactory because they either prevent the user from being able to see subtitle and/or closed caption data or these solutions display the subtitle for such a short period of time that any viewer is unlikely to have time to read the subtitles.

SUMMARY

Therefore, systems and methods are disclosed herein for presenting subtitle data during media asset fast-access playback operations. Specifically, the system may detect initiation of a fast-access playback operation during playback of a media asset and identify consecutive frames to be displayed during the fast-access playback operation that have associated subtitle data. The system may combine the subtitle data associated with the consecutive frames into a display arrangement and generate for display, with each consecutive frame, instead of the associated subtitle data, the display arrangement.

A media guidance application may be used to execute the described actions. The media guidance application may reside on a user device or a server or may be implemented to partially reside on a client device or a server device.

In some aspects, the media guidance application may present subtitle data during media asset fast-access playback operations using the following actions. Specifically, the media guidance application may detect initiation of a fast-access playback operation during playback of a media asset. For example, a viewer may input a fast-forward or rewind command while a media asset is playing.

The media guidance application may identify which frames will be displayed consecutively during the fast-access playback operation and which frames will be dropped (i.e., not displayed). Specifically, the media guidance application may determine, based on a play speed associated with the fast-access playback operation, that a first plurality of consecutive frames will be displayed during the fast-access playback operation. For example, the media guidance application may determine that the play speed for the media asset is 1.2×; therefore, the media guidance application may drop every fifth frame or display forty-five frames and drop five frames.

The media guidance application may identify frames that have associated subtitle data. Specifically, the media guidance application may retrieve, for each of the first plurality of consecutive frames, a corresponding indicator indicating whether each frame of the first plurality of consecutive frames is associated with corresponding subtitle data. For example, the media guidance application may retrieve from some of the frames an indicator that the frames do not have associated subtitle data and for some of the frames an indicator that the frames do have associated subtitle data.

The media guidance application may select consecutive frames that have associated subtitle data for processing. Specifically, the media guidance application may select, based on the corresponding indicator for each frame in the first plurality of consecutive frames, a second plurality of consecutive frames from the first plurality of consecutive frames, where the second plurality of consecutive frames includes consecutive frames each having the corresponding subtitle data. For example, the media guidance application may determine that the first plurality of frames includes one hundred fifty frames and that the first one hundred consecutive frames have associated subtitle data.

The media guidance application may retrieve the subtitle data associated with the selected frames and combine unique subtitle data for preparation for display. Specifically, the media guidance application may generate combined subtitle data that includes the corresponding subtitle data for the second plurality of consecutive frames that does not match subtitle data of the immediately preceding frame of the second plurality of consecutive frames. For example, the media guidance application may iterate through the one hundred consecutive frames from the example above, and determine that the first fifty frames have the same associated subtitle data and the following thirty frames have identical subtitle data that is different from the subtitle data of the first fifty frames, and the final twenty frames have identical subtitle data that is different from the subtitle data of the first fifty frames and the following thirty frames. The media guidance application may store only three unique subtitle data entries, each associated with the corresponding set of frames (i.e., one entry for the first fifty frames, one entry for the next thirty frames, and one entry for the final twenty frames).

The media guidance application may use the stored combined subtitle data to generate a display arrangement for that data that enables a user to read the subtitle data while a fast-access playback operation is in progress. Specifically, the media guidance application may generate one or more display arrangements that include the combined subtitle data. For example, the media guidance application may determine that the three subtitle entries in the combined subtitle data can fit on the screen without causing any viewing difficulties for the user. As a result, the media guidance application may generate only one display arrangement to be displayed with the second plurality of consecutive frames. If the media guidance application determines that the combined subtitle data includes more entries than can fit on the screen without causing any viewing difficulties for the user, the media guidance application may generate multiple display arrangements.

The media guidance application may generate for display, during the fast-access playback operation, instead of the corresponding subtitle data, the one or more display arrangements with corresponding frames of the second plurality of consecutive frames. For example, the media guidance application may update pointers to the subtitle data to point to an appropriate, for the frame, display arrangement. In some embodiments, the media guidance application may add a pointer for each frame to an appropriate display arrangement. The media guidance application may use the pointer only during fast-access playback operations. During regular playback, the media guidance application may use default subtitles instead of the display arrangement.

In some embodiments, the media guidance application may generate for display a display arrangement with frames immediately following the frames that the display arrangement was assigned to if those later frames do not have subtitle data assigned to them. Specifically, the media guidance application may determine that a number of consecutive frames to be displayed immediately after the second plurality of consecutive frames do not have associated subtitle data. For example, the media guidance application may scan those frames and determine that there are no links in those frames to subtitle data.

The media guidance application may, in response to determining that the number of consecutive frames to be displayed immediately after the second plurality of consecutive frames do not have associated subtitle data, generate for display with the number of consecutive frames a display arrangement of the one or more display arrangements. For example, if the media guidance application determines that only one display arrangement is needed for the second plurality of consecutive frames, the media guidance application may generate for display that arrangement with the frames that are to be displayed immediately after the frames of the second plurality of consecutive frames, if those following frames do not have assigned subtitle data. If the media guidance application determines that multiple display arrangements are necessary to be displayed with the second plurality of consecutive frames, the media guidance application may display the last display arrangement to be displayed with the following frames.

In some embodiments, the media guidance application may determine, based on the play speed associated with the fast-access playback operation, that the first plurality of consecutive frames will be displayed during the fast-access playback operation by taking the following actions. The media guidance application may detect the play speed associated with the fast-access playback operation. For example, the media guidance application may retrieve the play speed from memory. In other embodiments, the media guidance application may detect the play speed from the user's command when the user initiates an appropriate command from a user input device (e.g., a user presses fast-forward on a remote control).

The media guidance application may select, based on the play speed, frames of the first plurality of frames that will be displayed during the fast-access playback operation. For example, the media guidance application may determine, based on the speed of the fast-forwarding operation, that forty of fifty frames will be displayed during the operation. The media guidance application may generate a data structure for each frame that will be displayed to store information about the frame. Specifically, the media guidance application may generate a data structure including a plurality of pointers, each identifying frames of the first plurality of frames that will be displayed during the fast-access playback operation. For example, the media guidance application may generate a data structure with pointers pointing to the forty of fifty frames.

In some embodiments, the media guidance application may take the following actions when retrieving, for each of the first plurality of consecutive frames, the corresponding indicator indicating whether each frame of the first plurality of consecutive frames is associated with subtitle data. The media guidance application may access a plurality of data structures, each associated with a corresponding frame of the first plurality of consecutive frames. For example, each frame may have an associated data structure that includes a pointer to the subtitle data associated with the frame. The media guidance application may access each data structure (e.g., in memory) in this process.

The media guidance application may find a field for the subtitle data. Specifically, the media guidance application may identify, in each of the plurality of data structures, a field associated with a corresponding indicator indicating whether a corresponding frame of the first plurality of consecutive frames is associated with subtitle data. For example, each data structure may have a plurality of fields, one of which may be a field indicating whether subtitle data is associated with the frame. Another field may include a link to the associated subtitle data. In some embodiments, the fields may be combined into one field. The media guidance application may retrieve a value from each field. For example, a field may be a Boolean field indicating whether subtitle data is available. In some embodiments, the field may include a pointer to the subtitle data if the frame has associated subtitle data and may be NULL or have no value if there is no associated subtitle data.

In some embodiments, the media guidance application may generate the combined subtitle data using the following actions. The media guidance application may determine, for each consecutive frame in the second plurality of consecutive frames, whether the corresponding subtitle data matches subtitle data of an immediately preceding frame. For example, the media guidance application may determine that subtitle data of the first ten frames is the same, while frame eleven includes subtitle data that is different from the subtitle data of frames one through ten. The media guidance application may also determine that frames eleven through thirty-five have the same subtitle data, while frames thirty-six through fifty have the same subtitle data that is different not only from the subtitle data of frames one through ten, but also from the subtitle data of frames eleven through thirty-five.

The media guidance application may, in response to determining that the corresponding subtitle data does not match subtitle data of the immediately preceding frame, store the corresponding subtitle data as an entry in a data structure representing the combined subtitle data. For example, the media guidance application may store the subtitle data associated with frame one, and it will not store the subtitle data of frames two through ten because the subtitle data of frames two through ten is identical to the subtitle data of frame one. When the media guidance application compares frame eleven to frame ten, the subtitle data will be saved, because the subtitle data associated with frame eleven is different from subtitle data of frame ten. The same analysis will be performed on all the frames in the second plurality of consecutive frames. To continue with the example above, frame thirty-five will have subtitle data different from that of frame thirty-six. Therefore, subtitle data associated with frame thirty-six will be stored.

In some embodiments, the media guidance application may generate the one or more display arrangements that include the combined subtitle data using the following actions. The media guidance application may retrieve the combined subtitle data for the second plurality of consecutive frames to be displayed during the media asset fast-access playback operation. For example, as the media guidance application determines the unique subtitle data, as exemplified above by scanning associated subtitle data for each frame and comparing to the previous frame's subtitle data, the media guidance application may store the combined subtitle data in memory (e.g., in a data structure). The media guidance application may retrieve the stored combined subtitle data from memory.

The media guidance application may determine a number of subtitle lines needed to display the combined subtitle data and a number of subtitle lines that can be displayed with each of the second plurality of consecutive frames. For example, the media guidance application may determine that three subtitle lines are needed to display the combined subtitle data and that four subtitle lines may be displayed on the display screen without interfering with user's experience.

The media guidance application may compare the number of subtitle lines needed to display the combined subtitle data with the number of subtitle lines that can be displayed with each of the second plurality of consecutive frames. To continue with the example above, the media guidance application may compare the number three (the number of lines needed for the combined subtitle data) with the number four (the number of lines that the display is able to present without impacting user experience).

The media guidance application may, in response to determining that the number of lines that can be displayed with each of the second plurality of consecutive frames is greater than or equal to the number of subtitle lines needed to display the combined subtitle data, generate one display arrangement for the combined subtitle data. As described above, the media guidance application may determine that the three lines needed to display the combined subtitle data is less than the four lines that may be displayed without impacting user experience, and generate one display arrangement.

In some embodiments, the media guidance application may determine the number of subtitle lines needed to display the combined subtitle data by executing the following actions. The media guidance application may access the data structure representing the combined subtitle data. For example, the media guidance application may store the combined subtitle data in a data structure (e.g., in memory). The media guidance application may retrieve/access that data structure. The media guidance application may calculate a number of entries in the data structure representing the combined subtitle data. For example, the media guidance application may, when storing the entries of the combined subtitle data as the media guidance application iterates through each frame (e.g., as described above), store the subtitle data for each frame as an entry in the data structure representing the subtitle data. The media guidance application may use each entry as a line for the display. In some embodiments, the media guidance application may combine multiple entries (e.g., two entries) into one line. For example, the media guidance application may continue combining the lines into the same entry until a specific number of characters is reached.

In some embodiments, the media guidance application may generate multiple display arrangements. Specifically, the media guidance application may, in response to determining that the number of lines that can be displayed with each of the second plurality of consecutive frames is less than the number of subtitle lines, generate multiple display arrangements for the combined subtitle data. For example, if the entries of combined subtitle data cannot be combined into a number of subtitle lines that can fit a display without impacting user experience, the media guidance application may generate multiple display arrangements.

In some embodiments, the media guidance application may generate multiple display arrangements for the combined subtitle data by taking the following actions. The media guidance application may retrieve the number of lines that can be displayed with each of the second plurality of consecutive frames. For example, the media guidance application may retrieve the number from memory (e.g., four subtitle lines).

The media guidance application may retrieve a number of entries that is equal to the number of lines that can fit onto a display without impacting user experience. Specifically, the media guidance application may retrieve a chronologically sequential number of entries from the combined subtitle data structure, where the chronologically sequential number of entries equals to the number of lines that can be displayed with each of the second plurality of consecutive frames. For example, the media guidance application may determine that four lines may fit onto the display without impacting user experience. Thus, the media guidance application may retrieve from the combined subtitle data four entries so that those entries can each be used as a line. In some embodiments, the media guidance application may combine multiple entries into a single line (e.g., if the amount of text in those lines allows for the combination).

The media guidance application may determine which lines should be displayed with which frames. Specifically, the media guidance application may retrieve a start frame identifier associated with a first frame corresponding to the chronologically sequential number of entries and an end frame identifier associated with a last entry corresponding to the chronologically sequential number of entries. For example, the media guidance application may determine that frames one to fifty correspond to three entries in the combined subtitle data. The media guidance application may determine that frame one is the first frame and frame twenty-five is the last frame.

The media guidance application may assign textual data associated with each of the chronologically sequential number of entries to each of the start frame, the end frame, and frames in between the start frame and the end frame. For example, the media guidance application may assign the textual data for the entries (e.g., a display arrangement) to the identified frames (e.g., frames one to twenty-five).

In some embodiments, the media guidance application may assign the textual data associated with each of the chronologically sequential number of entries to each of the start frame, the end frame, and the frames in between the start frame and the end frame using the following actions. The media guidance application may retrieve the textual data associated with each of the chronologically sequential number of entries. For example, the media guidance application may retrieve the text to be displayed in the display arrangement.

The media guidance application may generate a respective subtitle display line for the textual data associated with each of the chronologically sequential number of entries.

For example, if there are three entries that are to be displayed in the display arrangement, the media guidance application may place each entry (e.g., textual subtitle data) into a line to be displayed as part of the display arrangement. The media application may generate a first subtitle display arrangement by arranging each respective subtitle display line in chronological order. For example, the media guidance application may generate a display arrangement where the first line, chronologically, is on top, the second line, chronologically, is below the first line and the third line, chronologically, is below the second line.

The media guidance application may link the first display arrangement with each of the start frame, the end frame, and the frames in between the start frame and the end frame. For example, the media guidance application may place a pointer in the data structure associated with each frame to a respective display arrangement (e.g., the first display arrangement for frames one to fifty, as exemplified above).

In some embodiments, the media guidance application may enable a user to scroll through the display arrangements. For example, the media guidance application may highlight to a user the word within a given display arrangement that is being spoken. If the user has missed a portion of a previous display arrangement, the user is able to scroll back in order to view the missed portion. In some embodiments, the media guidance application may allow the user to scroll forward to the next display arrangement. For example, if the user has read the display arrangement quicker than it is displayed, the user may scroll to the next display arrangement. The media guidance application may update the highlighted word as the spoken words catch up to the display arrangement that is being displayed.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
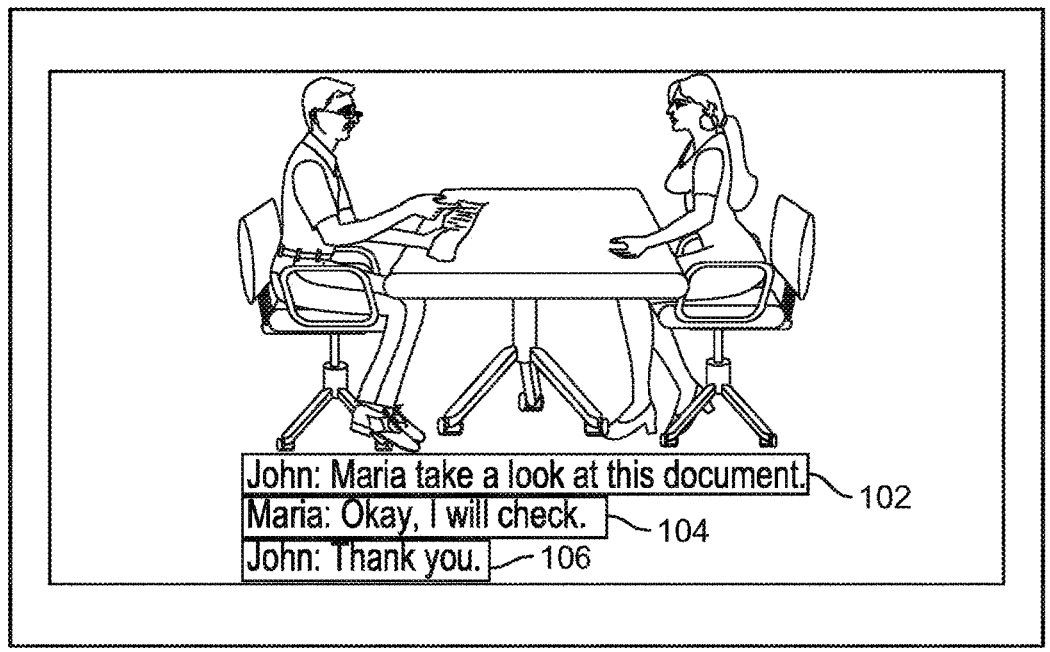
FIG. 1 shows an illustrative display of a display arrangement with a given frame of the display used in presenting subtitle data during media asset fast-access playback operations, in accordance with some embodiments of the disclosure.

Systems and methods are disclosed herein for presenting subtitle data during media asset fast-access playback operations. Specifically, the system may detect initiation of a fast-access playback operation during playback of a media asset and identify consecutive frames to be displayed during the fast-access playback operation that have associated subtitle data. The system may combine the subtitle data associated with the consecutive frames into a display arrangement and generate for display, with each consecutive frame, instead of the associated subtitle data, the display arrangement.

In some embodiments, the media guidance application may present subtitle data during media asset fast-access playback operations using the following actions. Specifically, the media guidance application may detect initiation of a fast-access playback operation during playback of a media asset. For example, the media guidance application may detect that a user interacted with a user input device (e.g., a remote control) in order to initiate a fast-access playback operation. The media guidance application may receive the fast-access playback operation and store in memory the command. In some embodiments, the media guidance application may also store the speed of the fast-access playback operation (e.g., fast-forward 1.2× or rewind 1.5×).

As referred to herein, the phrase "fast-access playback operation" should be understood to mean any media guidance application operation that pertains to playing back a non-linear media asset faster than normal playback speed or in a different order than the media asset is designed to be played, such as a fast-forward or rewind. The fast-access playback operation may be any playback operation that is not "play," where the play operation plays back the media asset at normal playback speed.

The media guidance application may identify which frames will be displayed consecutively during the fast-access playback operation and which frames will be dropped (i.e., not displayed). Specifically, the media guidance application may determine, based on a play speed associated with the fast-access playback operation, that a first plurality of consecutive frames will be displayed during the fast-access playback operation. For example, the media guidance application may determine that the play speed for the media asset is 1.2×. As a result, the media guidance application may identify which frames will not be displayed (e.g., every fifth frame). The media guidance application may determine which frames will be dropped (i.e., not displayed) by executing the same algorithm as executed during selection of frames to not display.

The media guidance application may identify frames that have associated subtitle data. Specifically, the media guidance application may retrieve, for each of the first plurality of consecutive frames, a corresponding indicator indicating whether each frame of the first plurality of consecutive frames is associated with corresponding subtitle data. For example, the media guidance application may iterate through a data structure associated with each frame of the first plurality of frames and retrieve the aforementioned indicator. The indicator may be a Boolean value, where a true indicator means there is associated subtitle data and a false indicator means there is no associated subtitle data. In some embodiments, the indicator may be a link/pointer to the subtitle data if there is associated subtitle data and if the link/pointer does not exist (e.g., the data structure field for the link/pointer is NULL), it may be an indication that no associated subtitle data is associated with the corresponding frame.

The media guidance application may select consecutive frames that have associated subtitle data for processing. Specifically, the media guidance application may select, based on the corresponding indicator for each frame in the first plurality of consecutive frames, a second plurality of consecutive frames from the first plurality of consecutive frames, where the second plurality of consecutive frames includes consecutive frames each having the corresponding subtitle data. For example, the media guidance application may iterate through each frame in the first plurality of frames until the media guidance application identifies a frame with associated subtitle data. The media guidance application may store a frame identifier associated with the frame as a start frame. The media guidance application may continue iterating through the first plurality of frames to identify a frame that does not have associated subtitle data (e.g., fifty frames later). The media guidance application may store the last frame associated with subtitle data as the stop frame.

The media guidance application may retrieve the subtitle data associated with the selected frames and combine unique subtitle data for preparation for display. Specifically, the media guidance application may generate combined subtitle data that includes the corresponding subtitle data for the second plurality of consecutive frames that does not match subtitle data of the immediately preceding frame of the second plurality of consecutive frames. For example, the media guidance application may iterate through each frame in the first plurality of frames, and compare subtitle data of each frame with subtitle data of a previous frame. The media guidance application may store subtitle data of each frame where the subtitle data doesn't match subtitle data of a previous frame. It should be noted that the subtitle data of the first frame will not match subtitle data of a previous frame because there is no previous frame; therefore, special instruction may be generated for the first frame. The subtitle data may be stored as a plurality of subtitle entries, each entry corresponding to unique instance of retrieved subtitle data.

The media guidance application may use the stored combined subtitle data to generate a display arrangement for that data that enables a user to read the subtitle data while a fast-access playback operation is in progress. Specifically, the media guidance application may generate one or more display arrangements that include the combined subtitle data. For example, the media guidance application may determine a number of subtitle lines that can be displayed on the display without impacting user experience. If the media guidance application determines that the combined subtitle data can fit into a number of subtitle lines that is less or equal to the number of subtitle lines that can be displayed without impacting user experience, the media guidance application may generate only one display arrangement to be displayed with the second plurality of consecutive frames. If the media guidance application determines that the combined subtitle data includes more entries than can fit on the screen without the viewing experience being impacted, the media guidance application may generate multiple display arrangements.

The media guidance application may generate for display, during the fast-access playback operation instead of the corresponding subtitle data, the one or more display arrangements with corresponding frames of the second plurality of consecutive frames. For example, the media guidance application may add pointers to the subtitle data to point to an appropriate, for the frame, display arrangement. The pointers may only be accessible while the media guidance application is performing a fast-access playback operation. In some embodiments, the media guidance application may replace a pointer for each frame to an appropriate display arrangement during a fast-access playback operation. During regular playback, the media guidance application may use default subtitles instead of the display arrangement. FIG. 1 shows an illustrative display of a display arrangement with a given frame of the display used in presenting subtitle data during media asset fast-access playback operations, in accordance with some embodiments of the disclosure. Line 102 may represent the first entry in the combined subtitle data, line 104 may represent the second entry in the combined subtitle data and line 106 may represent the third entry in the combined subtitle data. The three lines illustrate a display arrangement as discussed herein.

In some embodiments, the media guidance application may generate for display a display arrangement with frames immediately following the frames that the display arrangement was assigned to if those later frames do not have subtitle data assigned to them. Specifically, the media guidance application may determine that a number of consecutive frames to be displayed immediately after the second plurality of consecutive frames do not have associated subtitle data. For example, the media guidance application may iterate through frames following the second plurality of consecutive frames and retrieve from data structure(s) associated with those frames an indicator indicating whether each frame has associated subtitle data. The media guidance application may store an identifier associated with the first frame and the last frame that do not have associated subtitle data. It should be noted that in some embodiments, the media guidance application may store every frame instead of just the first and last frames.

The media guidance application may, in response to determining that the number of consecutive frames to be displayed immediately after the second plurality of consecutive frames do not have associated subtitle data, generate for display with the number of consecutive frames a display arrangement of the one or more display arrangements. For example, the media guidance application may determine the number of display arrangements needed to display the combined subtitle data. In response to determining that only one display arrangement is needed, the media guidance application may assign the display arrangement to the consecutive frames following the second plurality of consecutive frames. In response to determining that multiple display arrangements are needed to display the combined subtitle data, the media guidance application may assign the last display arrangement to be displayed to the consecutive frames following the second plurality of frames.

In some embodiments, the media guidance application may determine, based on the play speed associated with the fast-access playback operation, that the first plurality of consecutive frames will be displayed during the fast-access playback operation by taking the following actions. The media guidance application may detect the play speed associated with the fast-access playback operation. For example, the media guidance application may retrieve the play speed from memory. In some embodiments, the media guidance application may detect the play speed from the user's command when the user initiates an appropriate command from a user input device (e.g., a user hits fast-forward on a remote control).

The media guidance application may select, based on the play speed, the frames of the first plurality of frames that will be displayed during the fast-access playback operation. For example, the media guidance application may execute an algorithm to determine which frames will be displayed that is executed by the fast-access playback operation. The media guidance application may generate a data structure including a plurality of pointers, each identifying frames of the first plurality of frames that will be displayed during the fast-access playback operation. For example, the media guidance application may generate a data structure and iterate through that data structure, inserting pointers linking to the frames that will be generated for display.

In some embodiments, the media guidance application may take the following actions when retrieving, for each of the first plurality of consecutive frames, the corresponding indicator indicating whether each frame of the first plurality of consecutive frames is associated with subtitle data. The media guidance application may access a plurality of data structures each associated with a corresponding frame of the first plurality of consecutive frames. For example, each frame may have an associated data structure that includes a pointer to the subtitle data associated with the frame. The media guidance application may access each data structure (e.g., in memory) in this process.

The media guidance application may locate a field for the subtitle data. Specifically, the media guidance application may identify, in each of the plurality of data structures, a field associated with a corresponding indicator indicating whether a corresponding frame of the first plurality of consecutive frames is associated with subtitle data. For example, each data structure may have a plurality of fields, one of which may be a field indicating whether subtitle data is associated with the frame. Another field may include a link to the associated subtitle data. In some embodiments, the fields may be combined into one field. The media guidance application may retrieve a value from each field. For example, a field may be a Boolean field indicating whether subtitle data is available. In some embodiments, the field may include a pointer to the subtitle data if the frame has associated subtitle data and may be NULL or have no value if there is no associated subtitle data.

In some embodiments, the media guidance application may generate the combined subtitle data using the following actions. The media guidance application may determine, for each consecutive frame in the second plurality of consecutive frames, whether the corresponding subtitle data matches subtitle data of a immediately preceding frame. For example, the media guidance application may iterate through each frame of the second plurality of consecutive frames and retrieve the subtitle data of each frame. The media guidance application may retrieve the subtitle data associated with an immediately preceding frame and compare the subtitle data of the frame being iterated through with the subtitle data of the immediately preceding frame. The media guidance application may perform the comparison for every frame in the second plurality of consecutive frames.

The media guidance application may, in response to determining that the corresponding subtitle data does not match subtitle data of the immediately preceding frame, store the corresponding subtitle data as an entry in a data structure representing the combined subtitle data. For example, as the media guidance application iterates through each frame and compares the subtitle data associated with the frame with the subtitle data associated with an immediately preceding frame, the media guidance application may store the subtitle data if the comparison does not yield a match between the two frames. The media guidance application may store the subtitle data as an entry in the combined subtitle data.

In some embodiments, the media guidance application may generate the one or more display arrangements that include the combined subtitle data using the following actions. The media guidance application may retrieve the combined subtitle data for the second plurality of consecutive frames to be displayed during the media asset fast-access playback operation. For example, as the media guidance application determines the unique subtitle data, as exemplified above by scanning associated subtitle data for each frame and comparing to the previous frame's subtitle data, the media guidance application may store the combined subtitle data in memory (e.g., in a data structure). The media guidance application may retrieve the stored combined subtitle data from memory.

The media guidance application may determine a number of subtitle lines needed to display the combined subtitle data and a number of subtitle lines that can be displayed with each of the second plurality of consecutive frames. For example, the media guidance application may retrieve a number of subtitle lines that the display can present without impacting user experience. The media guidance application may iterate through the combined subtitle data and calculate the number of entries that corresponds to the number of subtitle lines that can be displayed.

The media guidance application may compare the number of subtitle lines needed to display the combined subtitle data with the number of subtitle lines that can be displayed with each of the second plurality of consecutive frames. The media guidance application may, in response to determining that the number of lines that can be displayed with each of the second plurality of consecutive frames is greater than or equal to the number of subtitle lines needed to display the combined subtitle data, generate one display arrangement for the combined subtitle data. The media guidance application may compare the results of the calculation with the retrieved number to determine that one display arrangement is required.

In some embodiments, the media guidance application may determine the number of subtitle lines needed to display the combined subtitle data by executing the following actions. The media guidance application may access the data structure representing the combined subtitle data. For example, the media guidance application may store the combined subtitle data in a data structure (e.g., in memory). The media guidance application may retrieve/access that data structure. The media guidance application may calculate a number of entries in the data structure representing the combined subtitle data. For example, the media guidance application may, when storing the entries of the combined subtitle data as the media guidance application iterates through each frame (e.g., as described above), store the subtitle data for each frame as an entry in the data structure representing the subtitle data. The media guidance application may use each entry as a line for the display. In some embodiments, the media guidance application may combine multiple entries (e.g., two entries) into one line. For example, the media guidance application may continue combining the lines into the same entry until a specific number of characters is reached. The media guidance application may determine the maximum number of characters that can be displayed in the subtitle lines on the display and combine the characters so that a maximum number of words can fit into the subtitle lines.

In some embodiments, the media guidance application may generate multiple display arrangements. Specifically, the media guidance application may, in response to determining that the number of lines that can be displayed with each of the second plurality of consecutive frames is less than the number of subtitle lines, generate multiple display arrangements for the combined subtitle data. For example, if the entries of combined subtitle data cannot be combined into a number of subtitle lines that can fit a display without impacting user experience, the media guidance application may generate multiple display arrangements.

In some embodiments, the media guidance application may generate multiple display arrangements for the combined subtitle data by taking the following actions. The media guidance application may retrieve the number of lines that can be displayed with each of the second plurality of consecutive frames. For example, the media guidance application may retrieve the number from memory (e.g., four subtitle lines).

The media guidance application may retrieve a number of entries that is equal to the number of lines that can fit onto a display without impacting user experience. Specifically, the media guidance application may retrieve a chronologically sequential number of entries from the combined subtitle data structure, where the chronologically sequential number of entries equals the number of lines that can be displayed with each of the second plurality of consecutive frames. For example, the media guidance application may iterate through the combined subtitle data and retrieve a number of entries equal to the number of subtitle lines that can be displayed. In some embodiments, the media guidance application may combine multiple entries into a single line (e.g., if the text in those lines allows for the combination). For example, if the media guidance application retrieves the number of entries equal to the number of lines that can be displayed without impacting user experience, the media guidance application may attempt to combine the data so another subtitle entry can be added in. However, in some embodiments, another subtitle entry may not fit because there may be too much textual data to add in.

The media guidance application may determine which lines should be displayed with which frames. Specifically, the media guidance application may retrieve a start frame identifier associated with a first frame corresponding to the chronologically sequential number of entries and an end frame identifier associated with a last entry corresponding to the chronologically sequential number of entries. For example, the media guidance application may iterate through each frame that is associated with the second plurality of consecutive frames and determine which display arrange should be displayed with each frame.

The media guidance application may assign textual data associated with each of the chronologically sequential number of entries to each of the start frame, the end frame, and frames in between the start frame and the end frame. For example, the media guidance application may assign the textual data for the entries (e.g., a display arrangement) to the identified frames (e.g., frames one to twenty-five).

In some embodiments, the media guidance application may assign the textual data associated with each of the chronologically sequential number of entries to each of the start frame, the end frame, and the frames in between the start frame and the end frame using the following actions. The media guidance application may retrieve the textual data associated with each of the chronologically sequential number of entries. For example, the media guidance application may retrieve the text to be displayed in the display arrangement.

The media guidance application may generate a respective subtitle display line for the textual data associated with each of the chronologically sequential number of entries. For example, the media guidance application may place each entry in the combined subtitle data into a line in the display arrangement. The media application may generate a first subtitle display arrangement by arranging each respective subtitle display line in chronological order. For example, the media guidance application may generate a display arrangement where each entry/line is displayed in chronological order, vertically.

The media guidance application may link the first display arrangement with each of the start frame, the end frame, and the frames in between the start frame and the end frame. For example, the media guidance application may place a pointer in the data structure associated with each frame to a respective display arrangement.

In some embodiments, the media guidance application may enable a user to scroll through the display arrangements. For example, the media guidance application may highlight to a user the word within a given display arrangement that is being spoken. The media guidance application may determine which word to highlight by analyzing the audio of the media asset using voice recognition algorithms, and comparing each word in the appropriate display arrangement with those words. If the user has missed a portion of a previous display arrangement, the user, the media guidance application may enable the user to scroll back in order to view the missed portion. For example, the media guidance application may enable user to input a command (e.g., via a remote control or another input device) a command to scroll up to a previous display arrangement in order to view that display arrangement. The media guidance application may in response to the scroll command retrieve that display arrangement. In some embodiments, the media guidance application may automatically (e.g., after a given time interval) replace the previous display arrangement with a now current display arrangement. For example, if a user scrolled back from a specific display arrangement, the media guidance application may update the screen when a new display arrangement is to be displayed. Specifically, if a second display arrangement is displayed, and the user scrolls back to a first display arrangement, the media guidance application may update the screen with the third display arrangement when it is time for the second display arrangement to be replaced by the third display arrangement.

In some embodiments, the media guidance application may enable the user to scroll forward to the next display arrangement. For example, if the user has read the display arrangement quicker than it is displayed, the user may scroll to the next display arrangement. The media guidance application may update the highlighted word as the spoken words catch up to the display arrangement that is being displayed. The media guidance application may receive a command from the user to scroll to a next display arrangement and may generate for display that arrangement. As the spoken words catch up to the display arrangement, the media guidance application may update an indicator highlighting the spoken word appropriately.

It should be noted that the systems and methods that have been described herein have been described in terms of subtitle data. However, these methods and systems equally apply to closed caption data.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
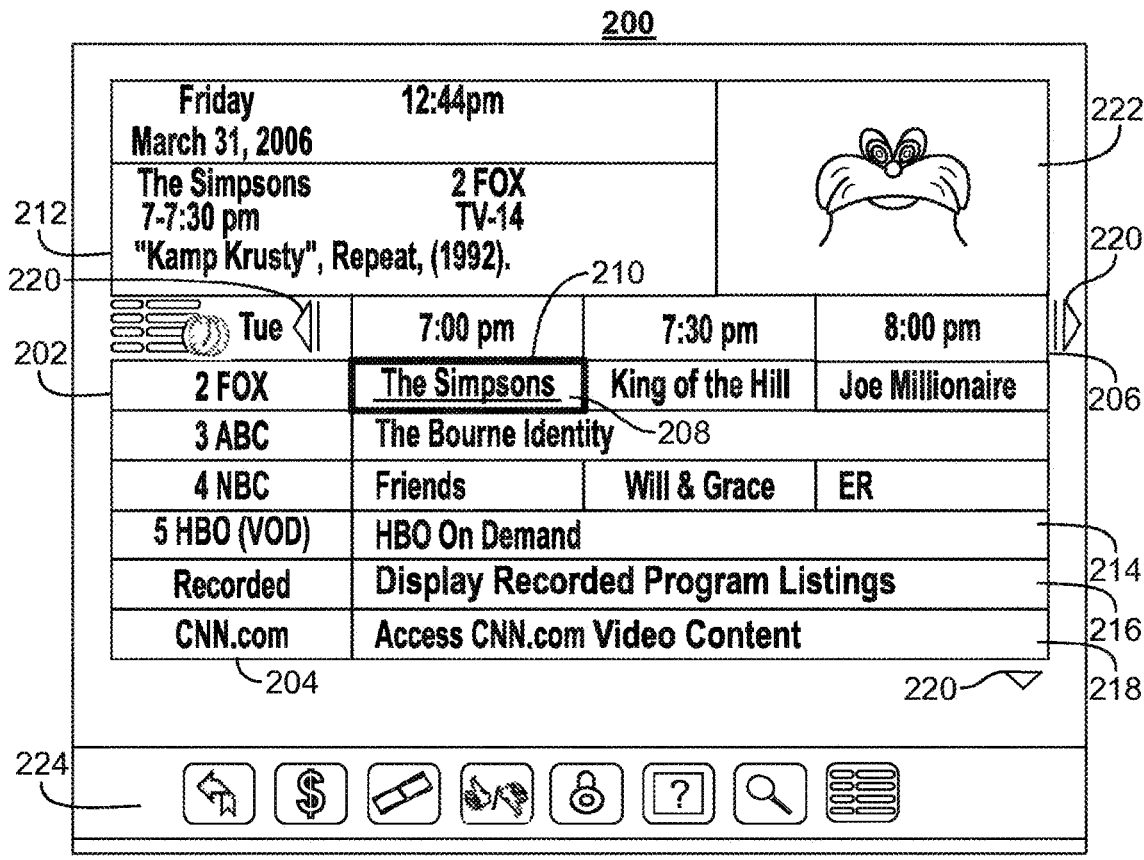
FIG. 2 shows an illustrative example of a display screen for use in accessing media content, in accordance with some embodiments of the disclosure.
Figure 3:
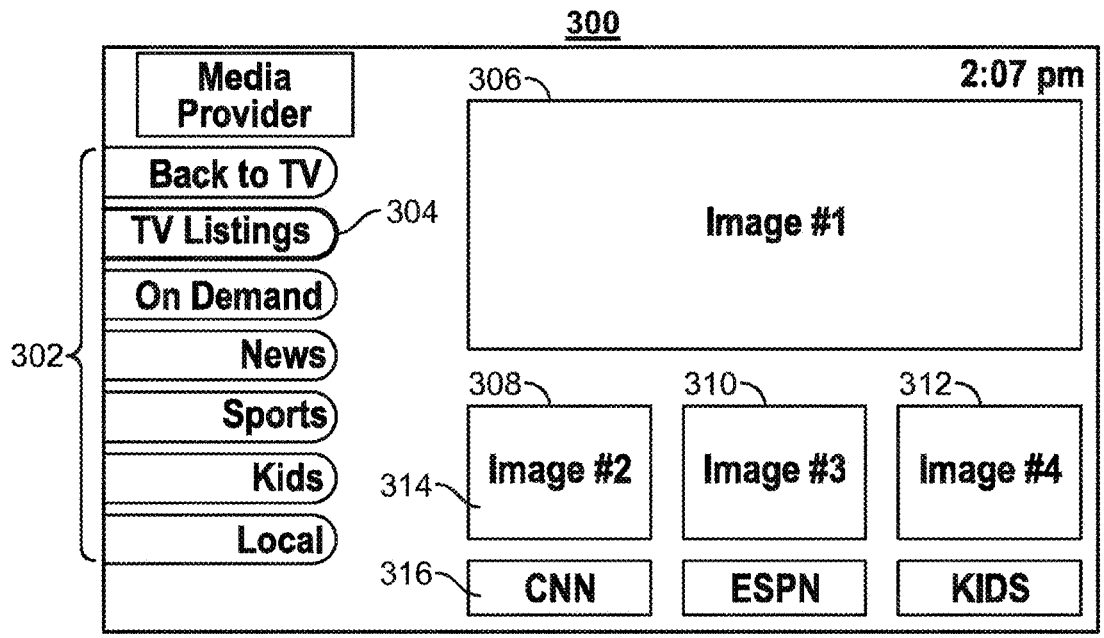
FIG. 3 shows another illustrative example of a display screen for use in accessing media content, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No.

2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
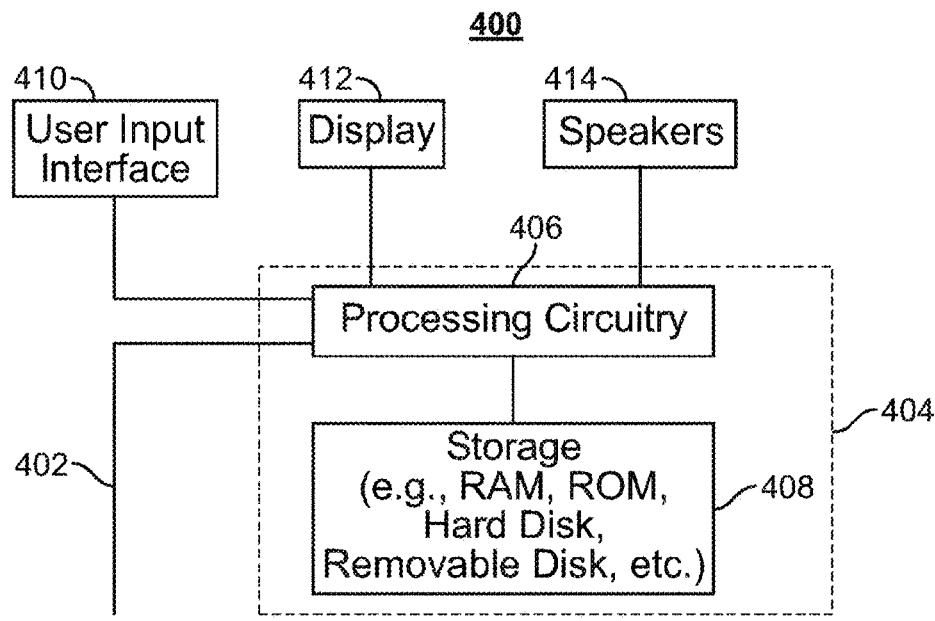
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
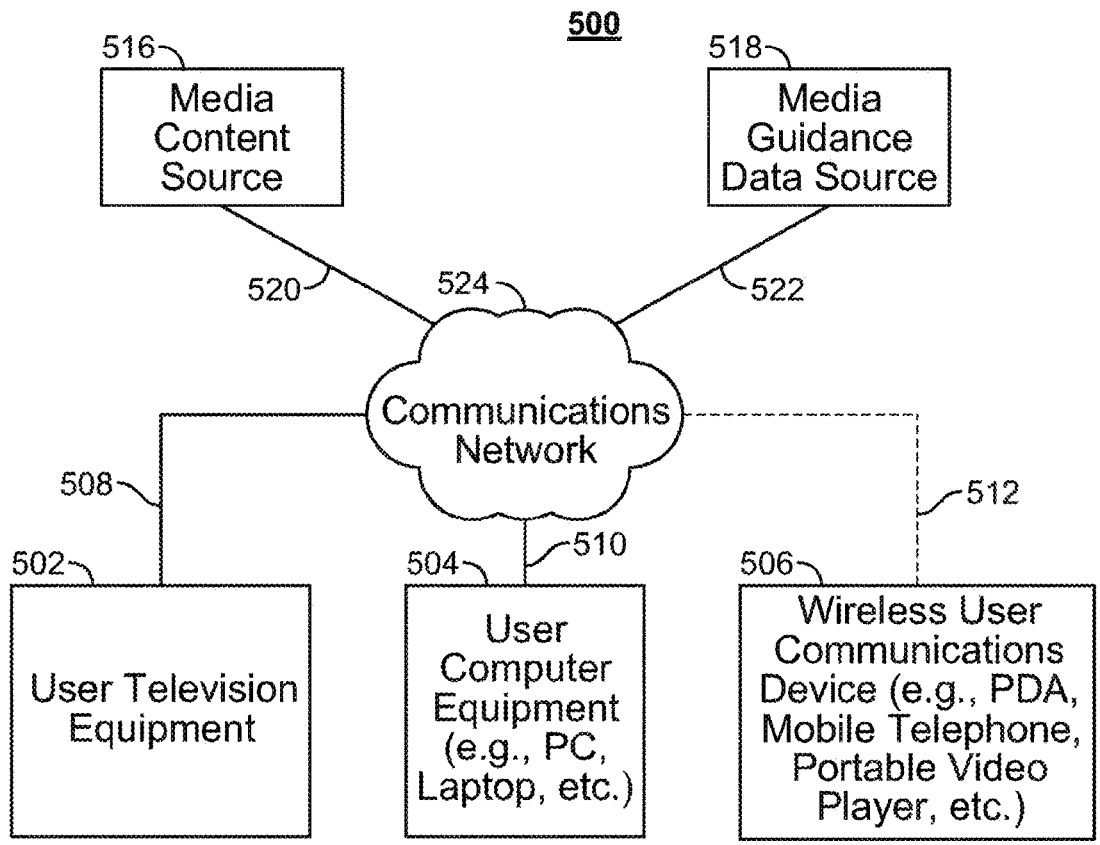
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
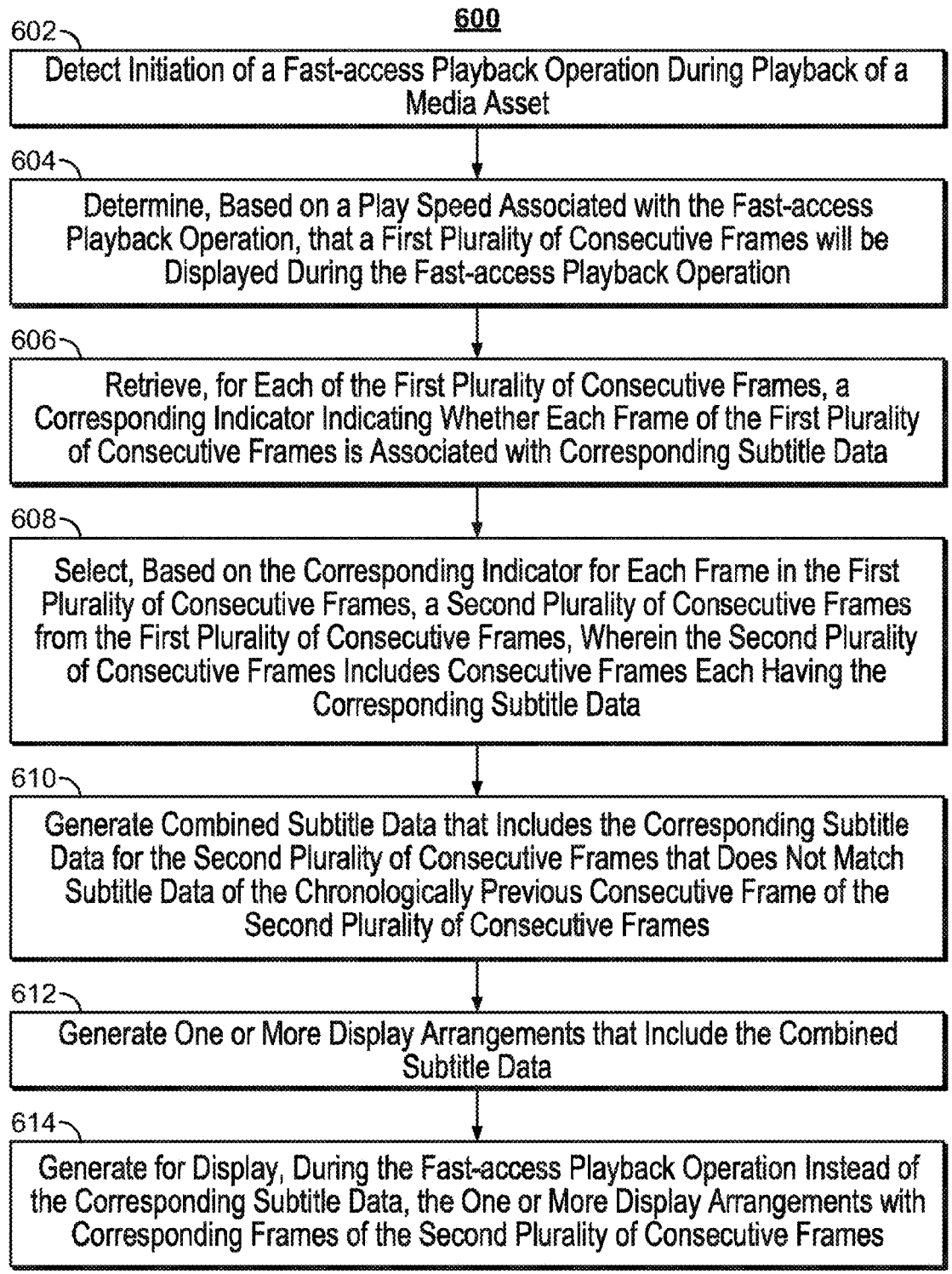
FIG. 6 is flowchart of illustrative actions for presenting subtitle data during media asset fast-access playback operations, in accordance with some embodiments of the disclosure.

FIG. 6 is flowchart of illustrative actions for presenting subtitle data during media asset fast-access playback operations, in accordance with some embodiments of the disclosure. At 602, control circuitry 404 detects initiation of a fast-access playback operation during playback of a media asset. For example, the control circuitry may detect input via a user input interface 410. In some embodiments, the media guidance application may detect the fast-access playback operation via I/O path 402. At 604, control circuitry 404 determines, based on a play speed associated with the fast-access playback operation, that a first plurality of consecutive frames will be displayed during the fast-access playback operation. The control circuitry may retrieve the play speed from storage 408 (e.g., from random access memory) and determine, based on the retrieved value, which frames will be displayed and which will be dropped.

At 606, control circuitry 404 retrieves, for each of the first plurality of consecutive frames, a corresponding indicator indicating whether each frame of the first plurality of consecutive frames is associated with corresponding subtitle data. The control circuitry may retrieve the indicator from storage 408. In some embodiments, the control circuitry may retrieve the corresponding indicators from a remote server (e.g., a server associated with media guidance data source 518 or media content source 516).

At 608, control circuitry 404 selects, based on the corresponding indicator for each frame in the first plurality of consecutive frames, a second plurality of consecutive frames from the first plurality of consecutive frames, where the second plurality of consecutive frames includes consecutive frames each having the corresponding subtitle data. The control circuitry may make the selection by storing pointers/links to the appropriate frames in memory.

At 610, control circuitry 404 generates combined subtitle data that includes the corresponding subtitle data for the second plurality of consecutive frames that does not match subtitle data of the immediately preceding frame of the second plurality of consecutive frames. The control circuitry may store in storage 408 the combined subtitle data. The combined subtitle data may be stored as a data structure (e.g., an array). In some embodiments, the data structure may be stored at a remote server (e.g., a server associated with media content source 516 or media guidance data source 518).

At 612, control circuitry 404 generates one or more display arrangements that include the combined subtitle data. The control circuitry may store the generated display arrangements in storage 408. In some embodiments, the display arrangements may be stored at a remote server (e.g., a server associated with media content source 516 or media guidance data source 518).

At 614, control circuitry 404 generates for display, during the fast-access playback operation, instead of the corresponding subtitle data, the one or more display arrangements with corresponding frames of the second plurality of consecutive frames. For example, the control circuitry may generate for display the one or more arrangements on display 412.

Figure 7:
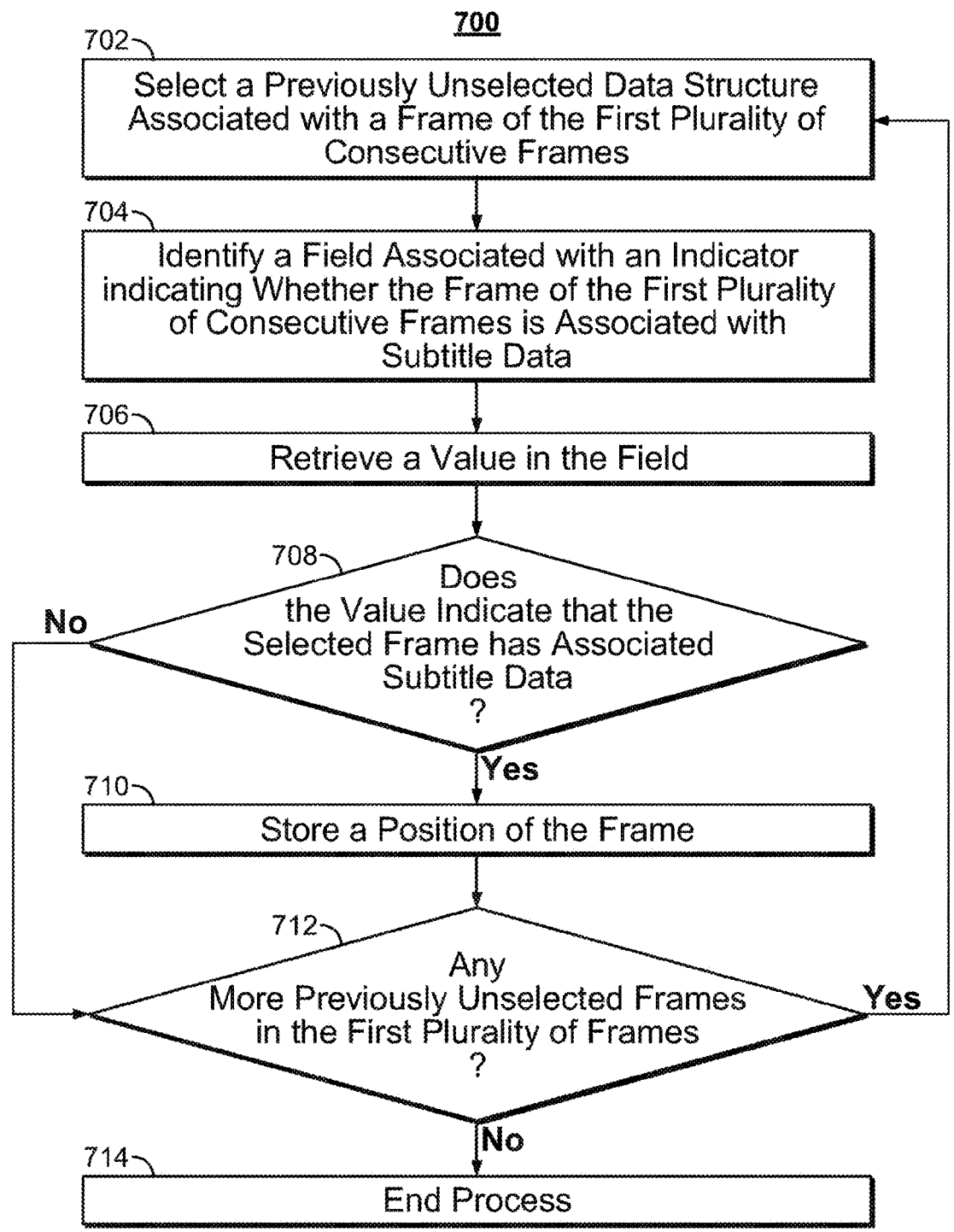
FIG. 7 is a flowchart of illustrative actions for determining which frames have associated subtitle data, in accordance with some embodiments of the disclosure.

FIG. 7 is a flowchart of illustrative actions for determining which frames have associated subtitle data, in accordance with some embodiments of the disclosure. At 702, control circuitry 404 selects a previously unselected data structure associated with a frame of the first plurality of consecutive frames. The control circuitry may iterate through each frame of the first plurality of consecutive frames by selecting each frame for processing. At 704, control circuitry 404 identifies a field associated with an indicator indicating whether the frames of the first plurality of consecutive frames are associated with subtitle data. The control circuitry may iterate through each field of each data structure associated with a corresponding frame and identify a field (e.g., by the name of the field) that includes the indicator.

At 706, control circuitry 404 retrieves a value in the field. The control circuitry, when the field is identified, may retrieve the value. At 708, control circuitry 404 determines whether the value indicates that the selected frame has associated subtitle data. If the control circuitry determines that the value indicates that the selected frame has associated subtitle data, process 700 moves to action 710. At 710, control circuitry 404 stores a position of the frame. For example, the control circuitry may store (e.g., in storage 408) a position of the frame in the media asset. In some embodiments, the control circuitry may store a frame identifier. Process 700 moves to 712.

If the control circuitry determines that the value indicates that the selected frame does not have associated subtitle data, process 700 moves to action 712. At 712, control circuitry 404 determines whether there are any more previously unselected frames in the first plurality of frames. If control circuitry 404 determines that there are no more previously unselected frames in the first plurality of frames, process 700 ends at 714. If control circuitry 404 determines that there are more previously unselected frames in the first plurality of frames, process 700 moves to 702.

Figure 8:
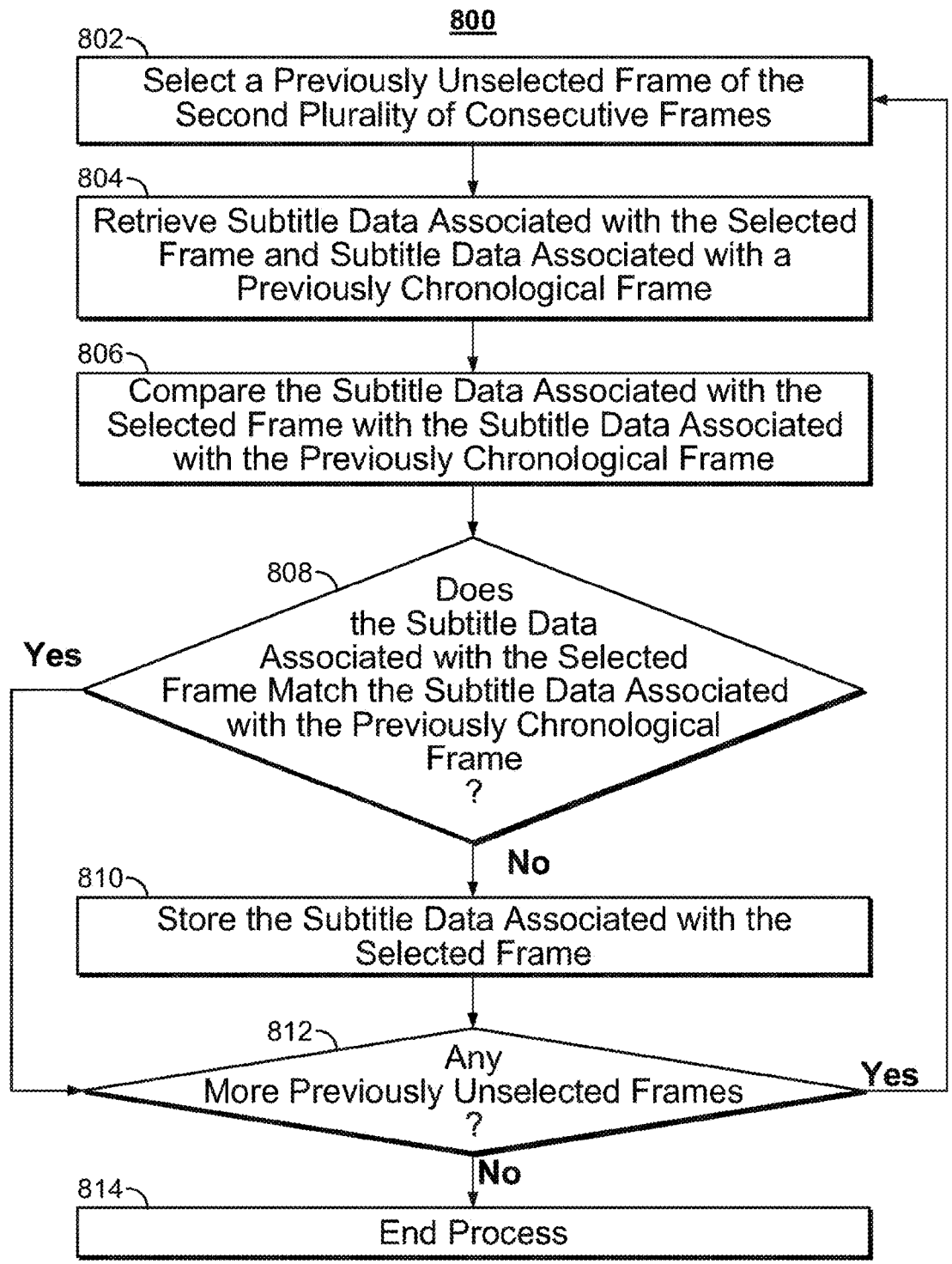
FIG. 8 is a flowchart of illustrative actions for generating combined subtitle data, in accordance with some embodiments of the disclosure.

FIG. 8 is a flowchart of illustrative actions for generating combined subtitle data, in accordance with some embodiments of the disclosure. At 802, control circuitry 404 selects a previously unselected frame of the second plurality of consecutive frames. For example, the control circuitry may iterate through each frame in the second plurality of consecutive frames and select each frame in turn for processing. At 804, control circuitry 404 retrieves subtitle data associated with the selected frame and subtitle data associated with an immediately preceding frame from storage 408. In some embodiments, the control circuitry may retrieve the subtitle data from a remote server (e.g., a server associated with media content source 516 and/or media guidance data source 518).

At 806, control circuitry 404 compares the subtitle data associated with the selected frame with the subtitle data associated with the immediately preceding frame. For example, the control circuitry may perform a textual comparison of the subtitle data. At 808, control circuitry 404 determines whether the subtitle data associated with the selected frame matches the subtitle data associated with the immediately preceding frame. If control circuitry 404 determines that the subtitle data associated with the selected frame does not match the subtitle data associated with the immediately preceding frame, process 800 moves to 810. At 810, control circuitry 404 stores the subtitle data associated with the selected frame. For example, the control circuitry may store the subtitle data in storage 408. In some embodiments, the control circuitry may store the subtitle data at a remote server (e.g., at a server associated with media content source 516 and/or media guidance data source 518). Process 800 moves to 812.

If control circuitry 404 determines that the selected frame matches the subtitle data associated with the immediately preceding frame, process 800 moves to 812. At 812, control circuitry 404 determines whether there are any more previously unselected frames. If there are no more previously unselected frames process 800 moves to 814 where it ends. If there are more previously unselected frames process 800 moves to 802.

Figure 9:
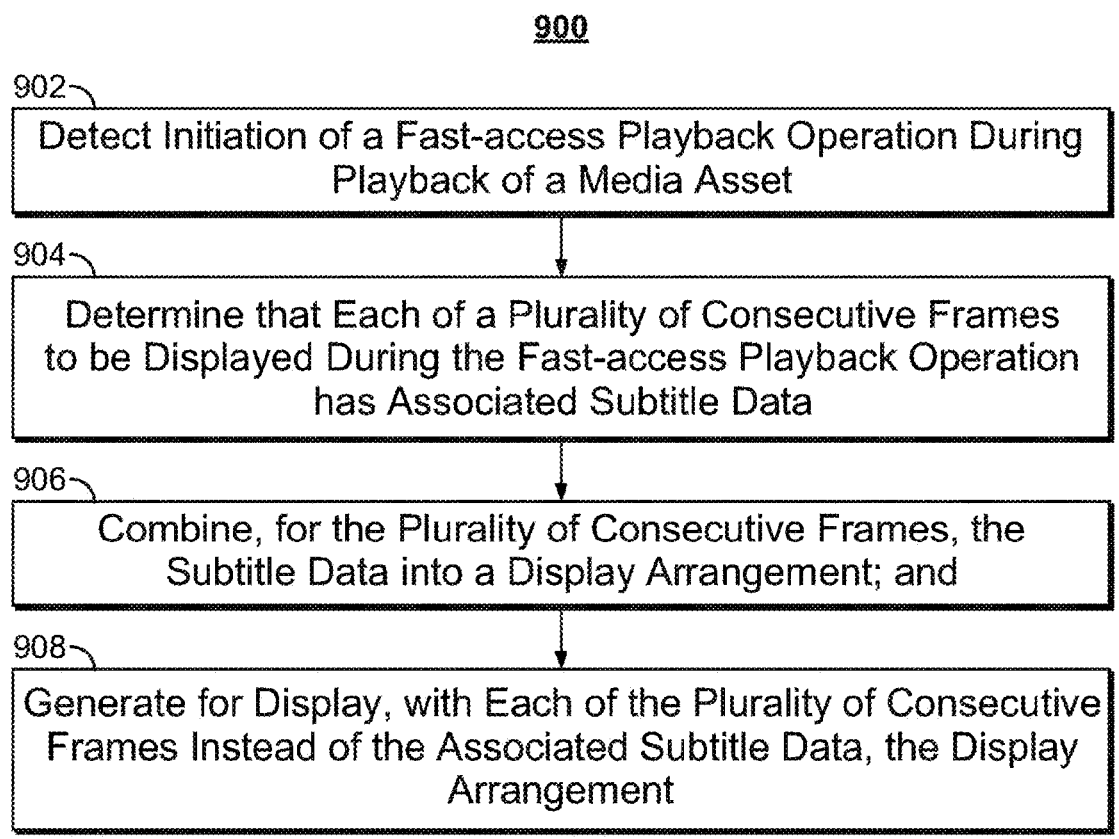
FIG. 9 is another flowchart of illustrative actions for presenting subtitle data during media asset fast-access playback operations, in accordance with some embodiments of the disclosure.

FIG. 9 is another flowchart of illustrative actions for presenting subtitle data during media asset fast-access playback operations, in accordance with some embodiments of the disclosure. Process 900 of FIG. 9 starts at 902, where control circuitry 404 detects initiation of a fast-access playback operation during playback of a media asset. For example, the control circuitry may detect input via a user input interface 410. In some embodiments, the media guidance application may detect the fast-access playback operation via I/O path 402. At 904, control circuitry 404 determines that each of a plurality of consecutive frames to be displayed during the fast-access playback operation has associated subtitle data. The control circuitry may make the determination by retrieve (e.g., from storage 408) play speed associated with the fast-access playback operation, and determining based on the play speed which frames will be displayed and which will not be displayed.

At 906, control circuitry 404 combines, for the plurality of consecutive frames, the subtitle data into a display arrangement. For example, the control circuitry may retrieve subtitle data for a plurality of frames from storage 408 and combine the subtitle data into a display arrangement. The control circuitry may store the display arrangement in storage 408 or on a remote server. At 908, control circuitry 404 generates for display, with each of the plurality of consecutive frames instead of the associated subtitle data, the display arrangement. For example, the control circuitry may generate for display the display arrangement on display 412.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   detecting initiation of a fast-access playing operation during playing of a media asset;
   identifying a first frame and a second frame to be displayed during the fast-access playing operation;
   determining that the first frame is associated with first text data based on determining that, during normal playing of the media asset, the first text data is displayed during the first frame;
   determining that the second frame is associated with second text data based on determining that, during the normal playing of the media asset, the second text data is displayed during the second frame, wherein the first text data is different than the second text data, and during the normal playing of the media asset, the second text data is not displayed while the first frame is displayed, and the first text data is not displayed while the second frame is displayed;
   combining the first text data and the second text data into a display arrangement;
   generating for display, with the first frame during the fast-access playing operation, the display arrangement; and
   generating for display, with the second frame during the fast-access playing operation, the display arrangement.

2. The method of claim 1, wherein:
   the first text data comprises subtitle data of the first frame; and
   the second text data comprises subtitle data of the second frame.

3. The method of claim 1, wherein:
   the first text data comprises closed caption data of the first frame; and
   the second text data comprises closed caption data of the second frame.

4. The method of claim 1, wherein the first frame is included in a first plurality of consecutive frames, and the second frame is included in a second plurality of consecutive frames, the second plurality of consecutive frames being displayed immediately after the first plurality of consecutive frames during the fast-access playing operation.

5. The method of claim 1, wherein:
   the first text data and the second text data are included in a chronologically sequential number of text data entries,
   identifying the first frame and the second frame to be displayed during the fast-access playing operation comprises:
     retrieving a start frame identifier associated with the chronologically sequential number of entries and an end frame identifier associated with the chronologically sequential number of entries; and
     determining each of the first frame and the second frame is included in a plurality of frames comprising a start frame corresponding to the start frame identifier, an end frame corresponding to the end frame identifier, and one or more frames in between the start frame and the second frame.

6. The method of claim 5, wherein combining the first text data and the second text data into the display arrangement comprises:
   assigning text data associated with the chronologically sequential number of entries to each of the start frame, the end frame, and frames in between the start frame and the end frame.

7. The method of claim 1, wherein determining that the first frame is associated with first text data comprises:
   accessing a data structure associated with the first frame;
   identifying, in the data structure, a field associated with a corresponding indicator indicating whether the first frame is associated with the first text data; and
   retrieving a value from each field indicating the first frame is associated with the first text data.

8. The method of claim 1, wherein determining that the second frame is associated with second text data comprises:
   accessing a data structure associated with the second frame;
   identifying, in the data structure, a field associated with a corresponding indicator indicating whether the second frame is associated with the second text data; and
   retrieving a value from each field indicating the second frame is associated with the second text data.

9. The method of claim 1, further comprising:
   detecting a playing speed associated with the fast-access playing operation,
   wherein the first frame and the second frame are selected for inclusion in the display arrangement based on the detected playing speed associated with the fast-access playing operation.

10. The method of claim 1, wherein each of the first frame and the second frame depict a particular actor.

11. A computer-implemented system comprising:
    input/output circuitry configured to:
      detect initiation of a fast-access playing operation during playing of a media asset; and
    control circuitry configured to:

identify a first frame and a second frame to be displayed during the fast-access playing operation;

determine that the first frame is associated with first text data based on determining that, during normal playing of the media asset, the first text data is displayed during the first frame;

determine that the second frame is associated with second text data based on determining that, during the normal playing of the media asset, the second text data is displayed during the second frame, wherein the first text data is different than the second text data, and during the normal playing of the media asset, the second text data is not displayed while the first frame is displayed, and the first text data is not displayed while the second frame is displayed;

combine the first text data and the second text data into a display arrangement;

generate for display, with the first frame during the fast-access playing operation, the display arrangement; and generate for display, with the second frame during the fast-access playing operation, the display arrangement.

12. The system of claim 11, wherein:
the first text data comprises subtitle data of the first frame; and
the second text data comprises subtitle data of the second frame.

13. The system of claim 11, wherein:
the first text data comprises closed caption data of the first frame; and
the second text data comprises closed caption data of the second frame.

14. The system of claim 11, wherein the first frame is included in a first plurality of consecutive frames, and the second frame is included in a second plurality of consecutive frames, the control circuitry being configured to display one or more of the second plurality of consecutive frames immediately after the first plurality of consecutive frames during the fast-access playing operation.

15. The system of claim 11, wherein:
the first text data and the second text data are included in a chronologically sequential number of text data entries; and
the control circuitry is configured to:
identify the first frame and the second frame to be displayed during the fast-access playing operation comprises:
retrieve a start frame identifier associated with the chronologically sequential number of entries and an end frame identifier associated with the chronologically sequential number of entries; and
determine each of the first frame and the second frame is included in a plurality of frames comprising a start frame corresponding to the start frame identifier, an end frame corresponding to the end frame identifier, and one or more frames in between the start frame and the second frame.

16. The system of claim 15, wherein the control circuitry is configured to combine the first text data and the second text data into the display arrangement by:
assigning text data associated with the chronologically sequential number of entries to each of the start frame, the end frame, and frames in between the start frame and the end frame.

17. The system of claim 11, wherein the control circuitry is configured to determine that the first frame is associated with first text data by:
accessing a data structure associated with the first frame;
identifying, in the data structure, a field associated with a corresponding indicator indicating whether the first frame is associated with the first text data; and
retrieving a value from each field indicating the first frame is associated with the first text data.

18. The system of claim 11, wherein the control circuitry is configured to determine that the second frame is associated with second text data by:
accessing a data structure associated with the second frame;
identifying, in the data structure, a field associated with a corresponding indicator indicating whether the second frame is associated with the second text data; and
retrieving a value from each field indicating the second frame is associated with the second text data.

19. The system of claim 11, wherein the control circuitry is further configured to:
detect a playing speed associated with the fast-access playing operation; and
select the first frame and the second frame for inclusion in the display arrangement based on the detected playing speed associated with the fast-access playing operation.

20. The system of claim 11, wherein each of the first frame and the second frame depict a particular actor.

* * * * *